Feb. 26, 1957 F. W. CARY 2,782,787
LIMA BEAN OPENER
Filed Dec. 8, 1951 2 Sheets-Sheet 1
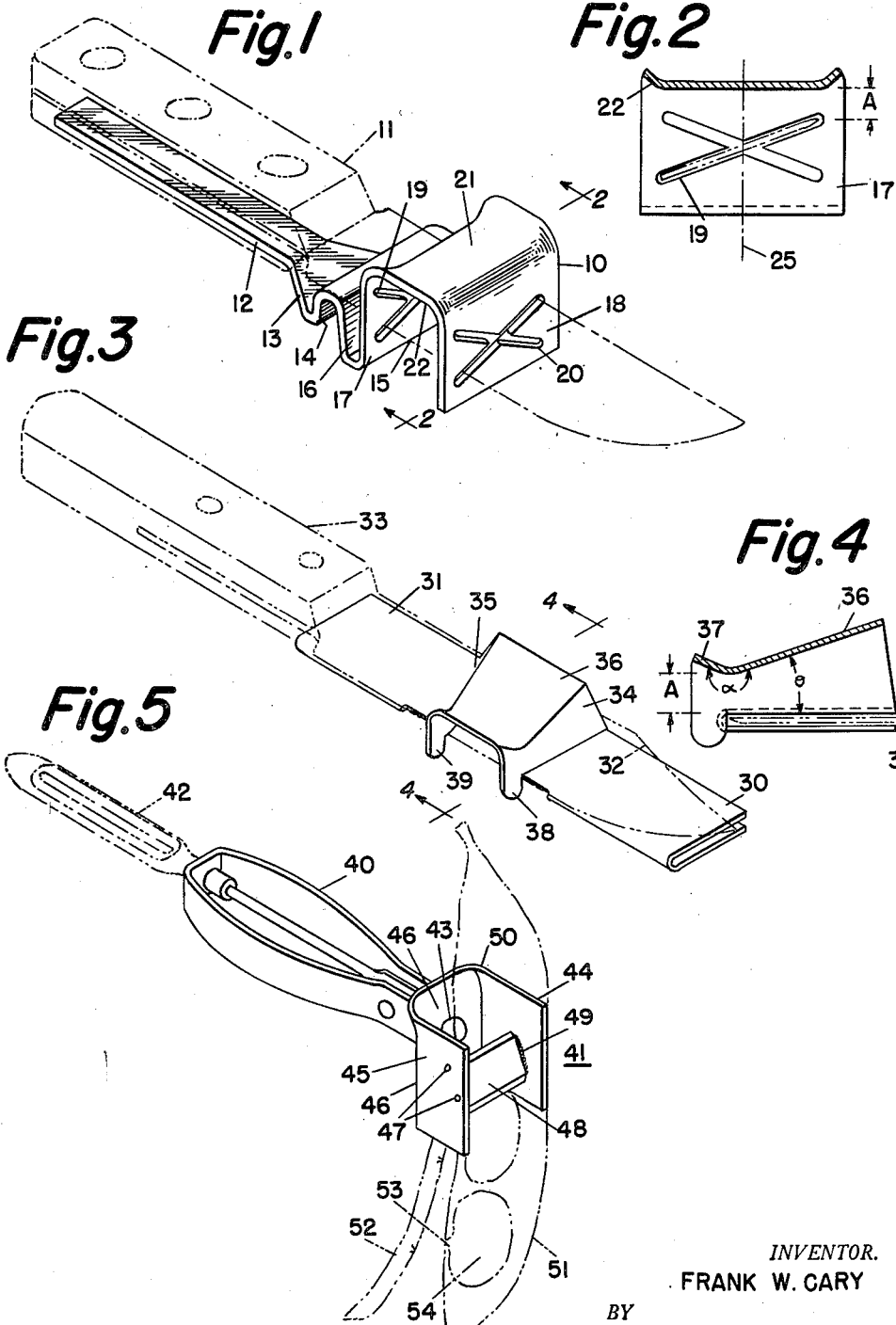
INVENTOR.
FRANK W. CARY
BY
Woodcock and Phelan
ATTORNEYS Feb. 26, 1957 F. W. CARY 2,782,787
LIMA BEAN OPENER
Filed Dec. 8, 1951 2 Sheets-Sheet 2
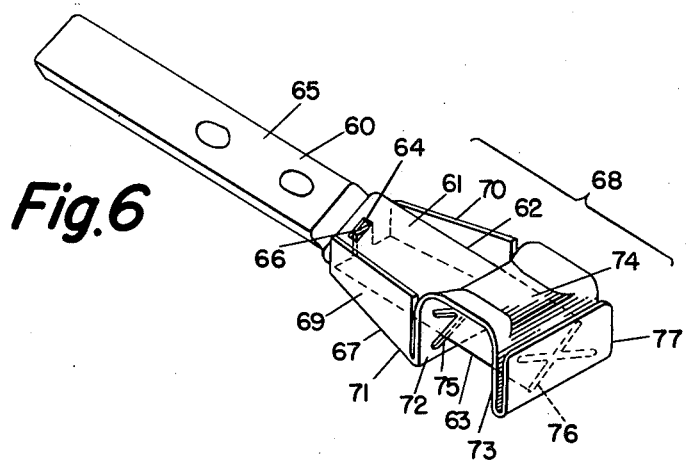
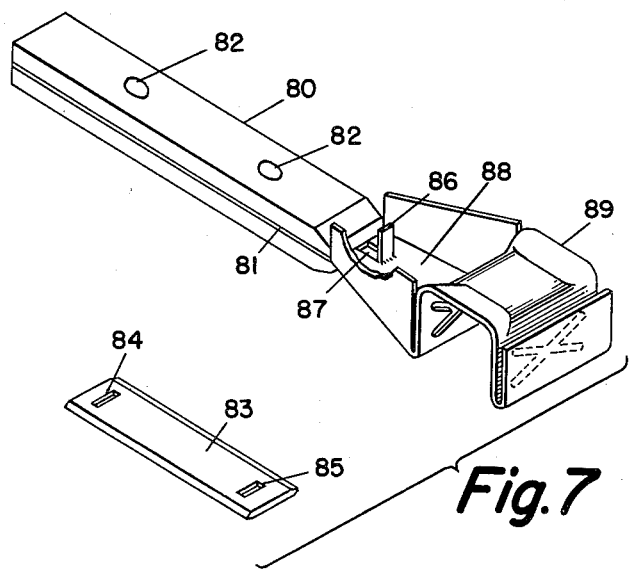
INVENTOR.
FRANK W. CARY
BY
Woodcock and Phelan
ATTORNEYS

United States Patent Office 2,782,787
Patented Feb. 26, 1957

2,782,787

LIMA BEAN OPENER

Frank W. Cary, Dresher, Pa.

Application December 8, 1951, Serial No. 260,666

10 Claims. (Cl. 130—30)

The present invention relates to vegetable cutting devices and more particularly to guide attachments for knives or cutter devices useful for removing lima beans of either bush or pole type from their pods.

In the shelling or depodding of lima beans in small quantities, such as for home use or the like, it has long been the practice to break the bean pod manually and individually remove the beans from the pod fragments or to cut the lima bean pod with an ordinary kitchen knife along the length of the pod furthest removed from that side where the beans are attached to the pod. After the pod has been cut or broken in this manner, the lima beans must be removed by pulling the pod apart and removing the beans individually from their attachment to the other side of the pod. The attaching cord or string of the pod to which the beans are appended is known as the ventral suture. Since such practice of removing lima beans from their pods heretofore has been slow and tedious in preparing lima beans in relatively small quantities, the preparation of lima beans in the home has been discouraged. The present invention provides a means for opening lima bean pods to facilitate the removal of beans therefrom in manner to be described hereinafter which permits the bean pods to be opened quickly and easily so that the beans will fall freely from the pod and which thereby renders the preparation of lima beans no more difficult than other vegetables prepared for domestic consumption.

In accordance with the invention it is possible without adjustment or manipulation of the cutting device to remove lima beans from their pods irrespective of the maturity of the beans. Devices constructed in accordance with the invention are adapted to take advantage of my discovery that lima bean pods develop substantially to their ultimate size prior to the growth of beans therein.

Further in accordance with the present invention it has been found that lima beans may be readily removed from their pods by progressive severance of the pod along the side to which the beans are attached, that is, along the ventral suture side of the pod. While it has been known heretofore lima beans could be removed from their pods by severance of this attachment between the beans and the ventral suture, this portion of a lima bean pod is particularly tough and any slippage during cutting or severance thereof by an ordinary knife may permit the knife to slip and cut into the beans themselves, thereby rendering the beans less desirable from the standpoint of appearance and cooking quality.

A further disadvantage of attempting to remove the ventral suture from the lima bean pod with an ordinary knife is the possibility of the knife slipping so that it will pass entirely through the bean pod and endanger the hands and fingers of the operator. In accordance with the invention, a device is provided for severing the ventral suture from the bean pod so the beans attached thereto are released from the pod without damage to the beans or danger of the knife or cutting edge slipping so as to cut transversely through the entire bean pod.

Further in accordance with the invention a guideway means is provided for positioning a cutting blade with respect thereto so that the pair of side walls of the guide means are transverse of the cutting blade and a guide surface and serve to control passage of the portion of the bean pod to be severed through said guideway means. The guide surface is so formed that at least a portion thereof extends ahead of and flares away from the cutting edge of the blade.

Further objects and advantages of the present invention will become apparent from the following detailed description taken in conjunction with the accompanying drawings which form an integral part of the present specification and in which:

Fig. 1 is a perspective view of one form of an attachment for a knife in accordance with the present invention;

Fig. 2 is a cross-sectional view in the direction of arrows 2—2 in Fig. 1;

Fig. 3 is a perspective view of another attachment for a knife in accordance with the present invention;

Fig. 4 is a cross-sectional view taken in the direction of arrows 4—4 in Fig. 3;

Fig. 5 is a perspective view partially broken away to show the construction of another form of cutting device in accordance with the present invention;

Fig. 6 is a perspective view of a preferred form of the invention; and

Fig. 7 is a perspective view partially broken away and partially exploded of another form of the invention.

Referring now to the drawings and in particular to Figs. 1 and 2, there is shown an attachment indicated generally as 10 for a kitchen knife 11 (shown in phantom). The knife 11 is shown in an intermediate position prior to being moved into a final position as described below. Attachment 10 includes an elongated, knife-handle engaging portion 12 of relatively narrow width arranged to lie along and in juxaposition with the lower surface of the central portion of the handle of knife 11. One end of handle engaging portion 12 flares into a wider section designated as 13 which joins an upwardly bent portion 14 adapted to engage the end of the handle of knife 11 in a final operative position. Portion 14 thereby serves as a stop or positioning means for locating knife 11 with respect to attachment 10. Portion 14 is then joined to a guideway means proper designated as 15 by an S-shaped section 16. Guideway means 15 in general comprises a pair of side walls 17 and 18 which are generally transverse to the blade of knife 11 which passes through side walls 17 and 18 through X-shaped openings 19 and 20, formed in the side walls 17 and 18, respectively. X-shaped openings 19 and 20 are so formed that a knife blade may pass through either of the crossed arms of the openings. By reversal of the position of the knife blade from one arm to the other, the attachment may be converted conveniently for either left-hand or right-hand cutting, dependent upon the desires of the operator. In Figs. 1 and 2 knife 11 is shown as being positioned for right-hand use. Between the side walls 17 and 18 there extends a portion 21 which is formed directly to provide a guideway surface 22. While guide surface 22 may be formed with any suitable configuration, said surface is desirably formed so that the space between the knife blade and the surface of member 22 flares away from the knife blade from a position directly ahead of the cutting edge. Further, surface member 22 is preferably so formed that when the knife and attachment are held with the cutting edge of the knife blade downward, a portion of the guide surface 22 extends downwardly to a point below the cutting edge. In this way the lima bean pod is properly guided in its approach to the cutting edge of the knife. It has been found in practice that the spacing designated as A in Fig. 2 between the cutting edge and the guideway surface of between about one-eighth of an inch and one-quarter of an inch is generally suitable for the average sized lima bean, and more particularly it has been found that a spacing of approximately three-sixteenths of an inch is highly satisfactory for general use in the severance of the ventral sutures from lima beans of any degree of maturity. In the present embodiment, it will be noted that the guide surface 22, as best seen in Fig. 2, has been formed symmetrical about a central axis, designated generally as 25, so that the knife blade may be inserted in either arm of X-shaped opening 19 for either right-hand or left-hand operation. With the knife blade reversed from the position shown in Fig. 2, that is, with the knife blade passing through the other arm of X-opening 19, it will be noted that the guideway surface extends to a point ahead of the cutting edge and that the guideway surface and the cutting edge of the knife blade flare away from each other so that with reversed operation of the attachment for left-hand use, the same relative position is obtained between the knife blade and the guideway surface as is obtained when the knife and attachment are assembled for right-hand use, as shown in Figs. 1 and 2.

Referring now to the embodiment of the invention illustrated in Figs. 3 and 4, there is shown another form of the invention. This embodiment has a practical advantage over the form shown in Figs. 1 and 2 in that the arrangement of Figs. 3 and 4 may be readily formed from a single piece of sheet metal by simple cutting and forming operations in a die press. As illustrated, the present attachment is formed by folding the outer ends 30 and 31 into a U-shaped configuration to receive and engage frictionally both sides of blade 32 of a paring knife 33 (both indicated in phantom). The central portion of the sheet metal strip is offset and formed to provide a pair of transverse side wall members 34 and 35 which between them support a guideway section 36. As best seen in Fig. 4, guideway surface portion 36 is so formed that with knife blade 32 in position, the guide surface of portion 36 flares outwardly and away from the knife blade from a position adjacent and opposite the cutting edge of knife blade 32. It will be noted that the included angle θ between the knife blade 32 and portion 36 is acute.

To control or guide the approach of a bean pod to the cutting edge of the knife blade, the guide surface 36 is likewise formed with a portion 37 extending ahead of or below the cutting edge and this portion is maintained in a fixed position with respect to the knife blade cutting edge by a pair of folded ear portions 38 and 39. Ear portions 38 and 39 also serve to align the lima bean pod in its approach to the cutting edge as well as during the progressive severance of the ventral suture by preventing the pod from being turned at an angle to the cutting edge. It will be noted in Fig. 4 that the angle α between portion 37 and guide surface 36 is obtuse and that the distance A between the cutting edge of blade 32 and surface 36 is the same as in the embodiment shown in Figs. 1 and 2.

A particular advantage of the arrangement shown in Figs. 3 and 4 is that the attachment may be applied to a knife for either left- or right-hand operation of the knife and attachment by simply reversing ends 30 and 31 with respect to the handle of knife 33.

In Fig. 5, a further embodiment of the present invention is illustrated wherein a separate cutting device includes a cutting blade, as a unitary member thereof, attached to any suitable handle. In the present arrangement the device may be incorporated as a part of other kitchen utensils, such as a conventional potato peeler. As shown, the handle member 40 may be utilized either alone for the support of the lima bean cutter attachment, or cutting device 41, constructed in accordance with the present invention, or the opposite end of handle 40 may be utilized for other kitchen tools, such as potato peeler 42, indicated in phantom. As shown, the lima bean cutter is formed of a single piece of sheet metal and attached to handle 40 by any convenient means such as rivet 43. The U-shaped guideway means is formed by a pair of side walls 44 and 45 having disposed transverse therebetween a guideway portion 46. Preferably, the guideway means is formed in a die press by simply bending a metal strip to form sides 44 and 45 and guideway portion 46 into roughly a U-shaped configuration, as described in connection with the embodiments of Figs. 1–4.

As illustrated in the present embodiment, a cutter blade 48 is positioned with respect to side walls 44 and 45 by butt welding the ends of blade 48 to side walls 44 and 45, as by bead weld 49 or by spot welds 47. As shown, cutter blade 48 is mounted with respect to guideway portion 46 so that the flared portion 50 of the guideway extends ahead of the cutting blade 48 and away from said edge. The angle between blade 48 and the remainder of guideway portion 46 is acute.

There is illustrated in Fig. 6 a preferred embodiment of the present invention which includes a specially constructed knife and an attachment somewhat similar to that shown in Fig. 1. In particular there is provided in the present embodiment a knife 60 having a blade 61 whose outer end is preferably cut or formed so that the blade has a rectangular configuration. Both edges 62 and 63 are preferably sharpened to provide cutting edges. Blade 61 is likewise provided with a locking slot 64 formed in the blade adjacent the handle 65 of knife 60. The slot 64 on blade 61 is arranged to frictionally engage a pin member 66 formed integrally with the blade shielding portion 67 of the knife attachment, designated generally as 68. The shield portion 67 is preferably formed with a pair of wall members 69 and 70 which cover the portion of knife blade 61 directly adjacent handle 65. The wall members 69 and 70 are formed so that together with portion 71 of attachment 68 a support is formed for the U-shaped guideway comprising the side wall members 72 and 73 and guide surface 74.

For the same purpose as explained in an embodiment described in connection with Fig. 1, side wall members 72 and 73 are provided with X-shaped openings 75 and 76, respectively, which permit knife blade 61 to pass through side walls 72 and 73 and position the cutting edges 62 or 63 with respect to guideway surface 74 in the same manner as described hereinbefore. It will be noted that side wall 73 is preferably formed with an extended portion 77 which is reversely bent back along side wall 73 to form an end abutment for the outer end of knife blade 61.

As described in connection with Fig. 1, the X-shaped openings 75 and 76 provide an arrangement by which the knife blade may be inserted for either right-hand or left-hand use depending upon the desires of the user. In the installation of knife 60 and blade 61 into attachment 68, preferably either the knife blade or the body of attachment 68 is sufficiently flexible so that the blade may first be inserted through either of the corresponding legs of X-shaped openings 75 and 76. After the blade is fully inserted through the side wall members 72 and 73 so that the end of knife blade 61 abuts the reversely bent portion 77, the pin member 66 will engage the slot 64 formed in blade 61. In this way the knife and attachment are held together so that there is no danger of slippage of the blade and attachment during the cutting operation of the lima bean and there is provided a tool which provides greater safety by adequately shielding the cutting edges from accidental contacting by the user.

As mentioned hereinabove, knife blade 61 is provided with sharpened edges 62 and 63 which in addition to providing cutting edges for either left- or right-hand usage, depending upon which legs of the X-shaped openings the knife blade passes through, additionally provides means for detaching the tips of the lima bean pods so that the operation of progressively severing the ventral suture is greatly facilitated. It has been found in practice that lima bean pods frequently have their tips curved in a direction back along the bean pod. It is desirable to sever this oppositely curved tip so that the bean may be more easily fed through the guideway and over the cutting edge. The side of the blades which flares outwardly from the guide surface 74 and is farthest therefrom, in Fig. 6, edge 63, may be readily used for this purpose. The additional clearance between edge 63 and surface 74 is due to the acute angle between the blade and the guideway surface 74. This clearance permits the divergent side, edge 63 of blade 61, to engage readily the recurved portion of the tip.

Referring now to the embodiment of the invention shown in Fig. 7, there is illustrated another embodiment of the invention, somewhat similar in form to that shown in Fig. 6. However, in the present embodiment, the cutting device is preferably formed so that an integral handle 80 may be attached to an extended portion 81 of the device, as by means of rivets 82. However, as distinguished from the embodiment of Fig. 6, the present arrangement includes a double-edged detachable knife blade 83, shown in its detached position, having formed therein a pair of slots 84 and 85 adjacent its opposite ends. For the same purpose as disclosed in connection with the previous embodiments, Fig. 6, shield portion 88 is provided with a pin member 86 adapted to engage either of the slots 84 or 85 of blade 83. The cutting device of Fig. 7 in other respects is identical with that shown in Fig. 6 with the exception that there is provided an opening 87 in the upper surface of shield portion 88 to permit the insertion of a tool in the form of a pin, nail or the like to deflect or bend the end of knife blade 83 nearest handle 81. This provision is of particular use in the removal of blade 83 from the device.

A particular advantage of the arrangement of Fig. 7 is that the shield portion 88 may be of sufficient length with respect to the U-shaped opening 89 forming the guideway portion of the cutting device so that detachable knife blade 83 may not only be reversed for right- or left-hand operation, but the blade 83 may be turned end for end as well as edge for edge to provide four different cutting edges for each blade. In this way a new freshly sharpened cutting edge may be provided quickly either by reversing and/or up-ending the blade that is in use or by inserting a new blade. The arrangement of Fig. 7 has the same advantages in the detipping operation as described for the embodiment of Fig. 6.

The operation of the knife attachment, or cutter arrangement, illustrated in Figs. 1–8 is particularly shown by the phantom illustration of a lima bean pod 51 passing through the embodiment shown in Fig. 5. As there illustrated, the side of the lima bean having the ventral suture as a part thereof may either be forced through the guideway means or the bean held stationary and the cutter device moved relative to the bean. By virtue of the spacing between the cutting edge of blade 48 and guideway surface 46, as illustrated in the embodiment of Fig. 5, a controlled amount of the ventral suture 52, which includes the attaching stems 53 for the beans 54 within the pod 51, passes over the cutting edge and the severed portion, including the ventral suture, passes downwardly through the space between the knife blade and the guideway surface 46. Since portion 50 of guideway surface 46 extends beyond or ahead of the cutting edge of blade 48, it is possible to start the knife through the bean pod and maintain the desired angle and spacing of the bean with respect to the cutting edge and the guideway surface as the cut portion of the bean passes over the knife blade. As shown in Fig. 5 it is possible by means of the present invention to sever the ventral suture 52, including the stem portions 53 to which the beans 54 have been attached. This is true whether or not the beans within the pod are fully matured, since I have found that the pod 51 develops substantially to maturity before the beans attain their full size. Since the beans 54 are exposed directly by the cutting action, the beans will fall out of pod 51 when the sides of the pod are easily opened by the fingers.

Accordingly, it will be seen that the beans may be readily and easily removed from pod 51 without the necessity of breaking them loose from their attachment to the ventral suture as has been necessary theretofore. In this way both the time and work involved in depodding lima beans is greatly reduced.

While five embodiments of the present invention have been illustrated and described, it will be apparent that numerous modifications and changes may be made in the foregoing examples of attachments for knives, as shown in Figs. 1–4 and 6, or the unitary cutting devices incorporating a cutting blade, as illustrated in Figs. 5 and 7, without departing from the scope of the present invention. All such modifications and changes may be made by those skilled in the art without departing from the scope of the present invention, as defined by the appended claims.

What is claimed is:

1. The combination with a knife of an attachment therefor comprising a body member having an elongated portion adapted to lie along a handle of said knife and having a pair of side wall members extending transversely to a blade of said knife, said side wall members having X-shaped slotted openings formed therein to permit the blade of said knife to pass therethrough, said side wall members having positioned therebetween a guide member displaced from the cutting edge of said knife when passed through the openings in the side wall members so that the ventral suture of a lima bean pod may pass between said guide surface and said knife blade, said guide member having at least a portion thereof extending ahead of the edge of said knife blade and flaring away from said edge to permit the alignment of said bean pod with respect to said knife blade prior to the cutting operation on the bean pod.

2. The combination with a knife of an attachment comprising a body member adapted to overlie a blade of said knife, said body member having a shield portion overlying a portion of said blade, said shield portion including a pin member adapted to engage a slot-defining portion of said blade adjacent a handle of said knife, said body member having a cutting guideway portion overlying another portion of said blade, said guideway portion comprising a pair of side wall members extending transversely to the blade of said knife, each of said side wall members having formed therein an X-shaped opening to permit the blade of said knife to pass therethrough, said side wall members having positioned therebetween a guide member displaced from a cutting edge of said knife blade when passed through said openings in said side wall members so that the ventral suture of a lima bean pod may pass between said guide surface and said knife blade, said guide member having at least a portion thereof extending ahead of said cutting edge of said knife blade and flaring away from said edge to permit the alignment of said pod with respect to said knife blade prior to the contacting of said knife blade by a lima bean pod.

3. A device for progressively detaching the ventral suture from a lima bean pod so that the beans attached thereto may be released from said pod comprising a cutting blade, a handle portion, a shield portion, and a guideway portion, said guideway portion comprising a pair of side wall members having a guideway section supported therebetween and having formed therein X-shaped-slotted openings to permit the cutting blade to pass through either of the legs thereof, means for securing said cutting blade to said device comprising a pin member connected to said shield portion and adapted to engage a slot formed in said cutting blade when said blade is passed through either of said legs of said X-shaped openings, and said guide surface having at least a portion thereof extending forwardly of the cutting edge of said cutting blade and flaring away from said edge to permit the introduction of a lima bean pod to said cutting edge.

4. A cutting blade attachment for properly positioning a lima bean pod before a cutting blade to sever the ventral suture thereof comprising a body member having a pair of side walls and a guide member transverse to and interconnecting said walls, each of said walls including a pair of intersecting slots defining an X-shaped opening for receiving the cutting blade, each of the slots extending at an acute angle with respect to the guide member, the blade being receivable by either of the slots for right- or left-hand use.

5. The combination with a knife, of a cutting blade attachment for properly positioning a lima bean pod before the cutting blade of said knife to sever the ventral suture of the pod comprising a body member having a pair of side walls, a guide member transverse to and interconnecting said walls, said body member having a portion extending transverse to said walls for underlying the handle portion of said knife, each of said walls including a pair of intersecting slots defining an X-opening for receiving the cutting blade, each of the slots extending at an acute angle with respect to said guide member, the blade being receivable by either of said slots for right- or left-hand use, and a stop means on said extending portion of said body member for engaging the leading edge of said knife handle for limiting the extent to which said cutting blade may be passed through either of said slots.

6. The combination with a knife of an attachment comprising a body member adapted to overlie a blade of said knife, said body member having a shield portion overlying a portion of said blade, said shield portion including a pin member adapted to engage a slot-defining portion of said blade adjacent a handle of said knife, said body member having a cutting guideway portion overlying another portion of said blade, said guideway portion comprising a pair of side walls members extending transversely to the blade of said knife, each of said side wall members having formed therein at least one opening to permit the blade of said knife to pass therethrough, said side wall members having positioned therebetween a guide member displaced from a cutting edge of said knife blade when passed through said openings of said side wall members so that the ventral suture of a lima bean pod may pass between said guide member and said knife blade, said guide member having at least a portion thereof extending ahead of said cutting edge of said knife blade and flaring away from said edge to permit the alignment of said pod with respect to said knife blade prior to the contacting of said knife blade by a lima bean pod.

7. A device for progressively detaching the ventral suture from a lima bean pod so that the beans attached thereto may be released from said pod comprising a cutting blade, a handle portion, a shield portion, and a guideway comprising a pair of side wall members having a guideway section supported therebetween and each of them having formed therein at least one slotted opening to permit the cutting blade to pass through both of said wall members, means for securing said cutting blade to said device comprising a pin member connected to said shield portion and adapted to engage a slot formed in said cutting blade when said blade is passed through said slotted openings, and said guide surface having at least a portion thereof extending forwardly of the cutting edge of said cutting blade and flaring away from said edge to permit an introduction of a lima bean pod to said cutting edge.

8. A device for severing the ventral suture from a lima bean pod for the release of beans attached thereto comprising a pair of closely spaced side walls of substantial length and breadth interconnected by an end wall, a single cutting blade extending between said side walls intermediate the ends thereof, the plane of said blade forming an acute angle with said end wall, the cutting edge of said blade being closer to said end wall than the remaining portion of said blade is to said end wall, and handle means extending from at least one of said walls.

9. The device of claim 8 in which said cutting blade is provided by a knife, the end of said blade extending beyond one of said side walls, and in which there is provided a body portion extending from said one of said side walls and adapted to overlie and frictionally engage both sides of said blade of said knife.

10. The device of claim 8 in which said single cutting blade extending between said side walls is fixedly secured thereto.

References Cited in the file of this patent

UNITED STATES PATENTS

| | | |
|---|---|---|
| 44,547 | Morahan | Oct. 4, 1864 |
| 420,780 | Fraue | Feb. 4, 1890 |
| 1,778,161 | Miller | Oct. 14, 1930 |
| 1,795,231 | Perl | Mar. 3, 1931 |
| 1,991,267 | Waldron et al. | Feb. 12, 1935 |
| 2,010,222 | Coughlan | Aug. 6, 1935 |
| 2,443,873 | Simpson | June 22, 1948 |

FOREIGN PATENTS

| | | |
|---|---|---|
| 195,220 | Great Britain | Mar. 29, 1923 |
| 664,477 | Germany | Sept. 1, 1938 |